US011489814B1

(12) United States Patent
Engskow et al.

(10) Patent No.: US 11,489,814 B1
(45) Date of Patent: Nov. 1, 2022

(54) CUSTOMIZED DOMAIN NAME RESOLUTION FOR VIRTUAL PRIVATE CLOUDS

(71) Applicant: Amazon Technologies, Inc., Seattle, WA (US)

(72) Inventors: Matthew Engskow, Arlington, VA (US); Kiran Thunga, Ashburn, VA (US); Vikram Saurabh, Broadlands, VA (US); Yu Wang, Falls Church, VA (US); Huida Tao, Herndon, VA (US); Rishi Goel, Cerritos, CA (US); Kevis Tsao, Reston, VA (US); Abhay Raina, Herndon, VA (US); Alexander Thomas Herrick, Herndon, VA (US); Jeffrey J Damick, South Riding, VA (US); Hemakshi Sharma, Rancho Palos Verdes, CA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 17/198,162

(22) Filed: Mar. 10, 2021

(51) Int. Cl.
*G06F 15/16* (2006.01)
*H04L 9/40* (2022.01)
*H04L 41/22* (2022.01)
*H04L 61/4511* (2022.01)

(52) U.S. Cl.
CPC .......... *H04L 63/0236* (2013.01); *H04L 41/22* (2013.01); *H04L 61/4511* (2022.05); *H04L 63/0263* (2013.01); *H04L 63/0272* (2013.01)

(58) Field of Classification Search
CPC .......... G06Q 120/3278; G06K 41/0803; H04L 69/229; H04L 29/08072
See application file for complete search history.

(56) References Cited

U.S. PATENT DOCUMENTS 7,665,132 B2    2/2010  Hisada et al.
8,661,114 B2 *  2/2014  Fleury ...................... H04L 9/40
                                                      709/224

(Continued)

OTHER PUBLICATIONS

Anandprasanna Gaitonde, et al., "Using Route 53 Private Hosted Zones for Cross-account Multi-region Architectures", Retrieved from https://aws.amazon.com/blogs/architecture/using-route-53-private-hosted-zones-for-cross-account-multi-region-architectures/, AWS Architecture Blog, Jan. 2021, pp. 1-7.

*Primary Examiner* — Khanh Q Dinh
(74) *Attorney, Agent, or Firm* — Robert C. Kowert; Kowert, Hood, Munyon, Rankin & Goetzel, P.C.

(57) ABSTRACT

Methods, systems, and computer-readable media for customized domain name resolution for virtual private clouds are disclosed. A domain name system (DNS) resolution service receives a DNS request from a computing resource associated with a virtual private cloud (VPC) in a cloud provider network. The service determines that the VPC is associated with one or more firewall rules. Responsive to determining that the VPC is associated with the firewall rule(s), the service determines whether the DNS request is allowed or blocked according to the one or more firewall rules. If the DNS request is allowed, the service resolves the DNS request using a DNS server and returns a response to the computing resource. If the DNS request is blocked, the service does not resolve the DNS request.

20 Claims, 8 Drawing Sheets

(56) References Cited

U.S. PATENT DOCUMENTS

| | | | |
|---|---|---|---|
| 8,676,916 B2 * | 3/2014 | Bellovin | H04L 9/40 |
| | | | 709/202 |
| 8,856,305 B2 | 10/2014 | Blacka et al. | |
| 9,185,127 B2 | 11/2015 | Neou et al. | |
| 9,253,013 B1 * | 2/2016 | Kolam | H04L 41/22 |
| 9,407,567 B2 * | 8/2016 | Li | H04L 61/5076 |
| 9,515,980 B2 * | 12/2016 | Eggleston | H04L 61/4511 |
| 9,531,628 B2 * | 12/2016 | Freedman | H04L 45/38 |
| 9,692,853 B2 * | 6/2017 | Chan | H04L 12/66 |
| 9,749,376 B2 * | 8/2017 | Bologh | H04L 65/60 |
| 9,948,505 B2 * | 4/2018 | Tiwari | H04L 41/0895 |
| 10,135,785 B2 | 11/2018 | Rolette et al. | |
| 10,270,755 B2 | 4/2019 | McPherson et al. | |
| 10,447,611 B2 | 10/2019 | Blacka et al. | |
| 10,686,753 B2 | 6/2020 | Redekop et al. | |
| 10,728,287 B2 | 7/2020 | Foxhoven et al. | |
| 10,791,085 B2 | 9/2020 | Thakar | |
| 10,819,697 B1 | 10/2020 | McPherson et al. | |
| 10,862,852 B1 | 12/2020 | Thunga et al. | |
| 11,301,350 B1 * | 4/2022 | Byrne | G06F 11/327 |
| 11,362,986 B2 * | 6/2022 | Thunga | H04L 67/565 |
| 2018/0278572 A1 * | 9/2018 | Halley | H04L 9/40 |

* cited by examiner

United States Patent US 11,489,814 B1

CUSTOMIZED DOMAIN NAME RESOLUTION FOR VIRTUAL PRIVATE CLOUDS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated. For example, the costs to manage distributed resources can increase with the complexity and scale of the resources.

Figure 1:
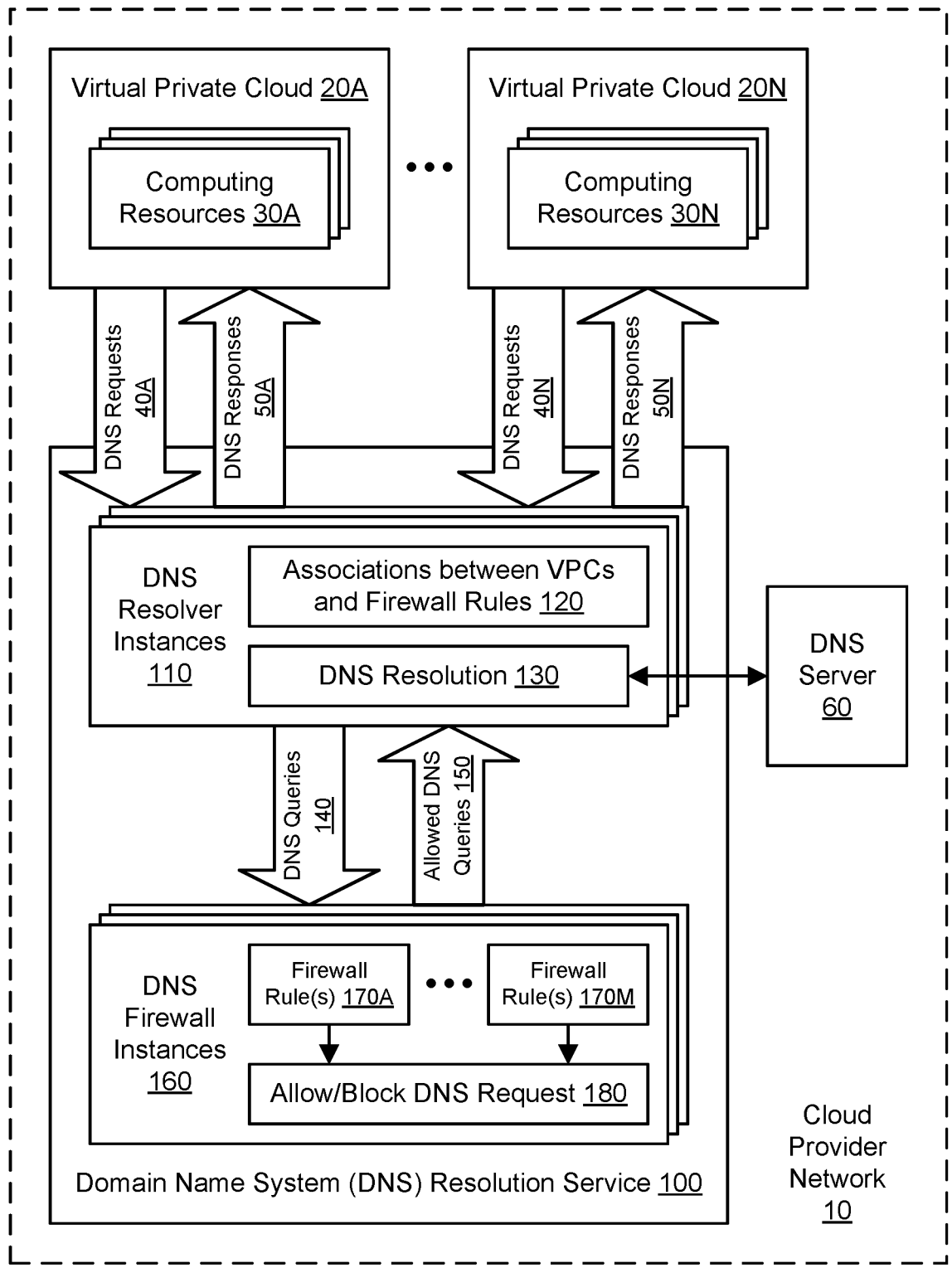
FIG. 1 illustrates an example system environment for customized domain name resolution for virtual private clouds, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for customized domain name resolution for virtual private clouds are described. The domain name system (DNS) is a globally distributed system that translates human-readable domain names into the numeric IP addresses that computers use to connect to each other via the Internet. DNS servers may translate requests for names into IP addresses, thus controlling which server an end user will reach when they type a domain name into their web browser. Some domains may represent websites operated by malicious actors or websites that are deemed inappropriate to access in a business environment. Additionally, some DNS lookup requests may themselves represent security threats. For example, a malicious DNS lookup request may communicate information such as a credit card number as a prefix in a domain name. Without sufficient security to block such DNS lookups, users may compromise their sensitive data.

The aforementioned challenges, among others, are addressed by embodiments of the techniques described herein, whereby a DNS resolution service may allow or block requests for DNS resolution according to customized firewall rules. A firewall rule may specify one or more domains (potentially including wildcards) and one or more actions to be taken (e.g., allow, block, alert) if DNS resolution is sought for those domains. The DNS resolution service may be offered to computing resources provisioned within or attached to virtual private clouds (VPCs) in a cloud provider network. Firewall rules may be selected or customized, associated with one or more VPCs, and deployed to components of the DNS resolution service by VPC administrators, e.g., via a user interface. A DNS request from a computing resource within or attached to a VPC may be routed to the DNS resolution service. The service may first determine whether the VPC is associated with any firewall rules. If not, the service may perform the DNS lookup. If so, the service may apply the rule(s), e.g., to allow a lookup or block a lookup. The DNS resolution service may allow a VPC administrator to easily customize and deploy a set of firewall rules across multiple VPCs or multiple availability zones of a cloud provider network. The DNS resolution service may be offered as a native service of such a provider network such that other services and resources of the provider network can easily leverage the rules-based firewall protection offered by the service.

As one skilled in the art will appreciate in light of this disclosure, embodiments may be capable of achieving certain technical advantages, including some or all of the following: (1) improving the security of computing resources within virtual private clouds (VPCs) by using customized allow and block lists for domain name system (DNS) resolution; (2) reducing the use of computing resources by allowing administrators to easily deploy the same set of firewall rules to more than one VPC; (3) reducing the use of computing resources by allowing administrators to easily deploy the same set of firewall rules to more than one availability zone; and so on.

FIG. 1 illustrates an example system environment for customized domain name resolution for virtual private clouds, according to some embodiments. A domain name server (DNS) resolution service 100 may provide highly available and scalable functionality such as DNS resolution, domain name registration, and health-checking web services. The DNS resolution service 100 may give developers and businesses a reliable and cost-effective way to route end users to Internet applications by translating names (e.g., example.com) into the numeric IP addresses (e.g., 192.0.2.1) that computers use to connect to each other. The DNS resolution service 100 may answer requests to translate specific domain names into their corresponding IP addresses.

Functionality of the DNS resolution service 100 may be provided to computing resources 30A-30N in virtual private clouds 20A-20N of a cloud provider network 10. A virtual private cloud (VPC) may represent an on-demand configurable pool of shared resources allocated within a cloud environment such as a cloud provider network 10. For example, computing resources 30A in VPC 20A may be provisioned from one or more pools of computing resources of a provider network 10 and offered to one set of users, and computing resources 30N in VPC 20N may be provisioned from one or more pools of computing resources of the provider network and offered to another set of users. In some embodiments, some of resources 30A may be attached or connected to VPC 20A, or some of resources 30N may be attached or connected to VPC 20N. A VPC may provide a degree of isolation between different organizations, users, or user groups. The isolation between one VPC user group and all other user groups of the same cloud provider network 10 (e.g., other VPC users as well as other cloud users) may be achieved through allocation of a private IP subnet and a virtual communication construct (such as a virtual local area network [VLAN] or a set of encrypted communication channels) per user group. In a VPC, isolation within the cloud provider network 10 may be combined with a virtual private network (VPN) function (e.g., as allocated per VPC user group) that secures the remote access of the organization to its VPC resources using techniques for authentication and encryption.

The domain name system (DNS) is a globally distributed system that translates human-readable names into the numeric IP addresses that computers use to connect to each other via the Internet. The Internet's DNS system works like a phone book by managing the mapping between names and numbers. For DNS, the names are domain names (e.g., www.example.com) that are easy for people to remember, and the numbers are IP addresses (e.g., 192.0.2.1) that specify the location of computers on the Internet. DNS servers may translate requests for names into IP addresses, thus controlling which server an end user will reach when they type a domain name into their web browser. These requests may be referred to as DNS queries.

In some embodiments, using the DNS resolution service 100, an administrator may combine DNS services with health-checking services to route traffic to healthy endpoints or to independently monitor and/or alarm on endpoints. Using the DNS resolution service 100, an administrator may also purchase and manage domain names and automatically configure DNS settings for those domains. The DNS resolution service 100 may connect user requests to infrastructure running in a cloud provider network 10, such as virtual compute instances, load balancers, and virtualized storage resources. In some embodiments, the DNS resolution service 100 may also be used to route users to infrastructure outside of the cloud provider network 10. In some embodiments, the DNS resolution service 100 may permit administrators to create and manage the IP addresses listed for their domain names in the DNS. In some embodiments, the DNS resolution service 100 may be used to create DNS records for a new domain or transfer DNS records for an existing domain. A standards-based REST API for the DNS resolution service 100 may permit administrators to easily create, update, and manage DNS records. In some embodiments, the DNS resolution service 100 may offer health checks to monitor the health and performance of application, web servers, and other resources.

In some embodiments, the DNS resolution service 100 may be implemented using a plurality of hosted zones. Each hosted zone may be served by its own set of virtual DNS servers. The DNS server names for each hosted zone may be assigned by the system when that hosted zone is created. Domain names may be recognizable names for numerically addressed Internet resources. In contrast, a hosted zone may be analogous to a traditional DNS zone file. A hosted zone may represent a collection of records that can be managed together and that belong to a single parent domain name. In some embodiments, all resource record sets within a hosted zone may have the hosted zone's domain name as a suffix. For example, the amazon.com hosted zone may contain records named www.amazon.com and www.aws.amazon.com but not a record named www.amazon.ca. In some embodiments, a user interface (e.g., a console) or application programming interface (API) associated with the DNS resolution service 100 may be used to create, inspect, modify, and delete hosted zones. In some embodiments, a user interface (e.g., a console) or application programming interface (API) associated with the DNS resolution service 100 may be used to register new domain names and transfer existing domain names under management by the DNS resolution service 100.

As discussed above, some domains may represent websites operated by malicious actors or websites known to host content inappropriate for business environments, and VPC administrators may seek to keep users of their VPCs from accessing those domains. Additionally, some DNS lookup requests may themselves represent security threats. For example, a malicious DNS lookup request may communicate information such as a credit card number as a prefix in a domain name. Using the DNS resolution service 100, administrators may configure and deploy firewall rules 170A-170M to allow or block requests for DNS resolution for particular domain names from VPCs. A firewall rule may specify one or more domain names, e.g., example.com or www.example.com. Firewall rules may include wildcards, e.g., *.example.com. A firewall rule may also indicate one or more actions to be taken if DNS resolution is sought for a specified set of domain names. For example, DNS requests for one set of domain names may be allowed, DNS requests for another set of domain names may be blocked (with configurable response codes or error codes), and DNS requests for yet another set of domain names may result in alerts to administrators or security teams. In some embodiments, domain names and/or actions may be specified by administrators, e.g., by typing names and selecting corresponding actions. In some embodiments, domain names may be selected by administrators from pre-defined domain names. For example, the service 100 may offer a predefined list of blocked domain names which administrators can select. The predefined list may be managed and updated by a security team and/or manager of the service 100. Domain names and actions for firewall rules may thus be customized by administrators of VPCs to meet the security needs of their organizations.

Once firewall rules have been specified or selected, administrators may create associations between particular sets of firewall rules and particular VPCs. For example, an administrator of VPC 20A may use a user interface or API of the DNS resolution service 100 to specify that firewall rule(s) 170A should be applied to VPC 20A. As another example, an administrator of VPC 20N may use a user interface or API of the DNS resolution service 100 to specify that firewall rule(s) 170M should be applied to VPC 20N. In some embodiments, two or more sets of firewall rules 170A-170M may be applied to a particular VPC 20A or 20N. In some embodiments, a set of firewall rules 170A or 170M may be applied to one particular VPC 20A or 20N. In some embodiments, the same set of firewall rules 170A or 170M may be applied to a plurality of VPCs 20A-20N.

Firewall rules may be selected or customized, associated with one or more VPCs, and deployed to components of the DNS resolution service by VPC administrators. In some embodiments, administrators may use a user interface associated with the service, such as a graphical user interface (GUI), command-line interface (CLI), and/or voice-enabled interface, to customize firewall rules and associate firewall rules with VPCs. In various embodiments, the user interface may be part of the service 100 itself or may instead be implemented using a management console of the cloud provider network 10. In some embodiments, administrators may use an application programming interface (API) or other programmatic interface offered by the service 100 to customize firewall rules and associate firewall rules with VPCs.

The DNS resolution service 100 may include components such as one or more DNS resolver instances 110 and one or more DNS firewall instances 160. The DNS resolver instances 110 may collectively be referred to as a DNS resolver, and the DNS firewall instances 160 may collectively be referred to as a DNS firewall. The DNS resolver instances 110 and DNS firewall instances 160 may represent fleets of components that collaborate to perform aspects of the functionality of the DNS resolution service 100. In some embodiments, one DNS resolver instance 110 may be associated with one DNS firewall instance 160 in a cellular architecture. In some embodiments, the cellular architecture may be used per availability zone. The DNS resolver instances 110 and DNS firewall instances 160 may apply the firewall rule(s) 170A-170M to perform specified actions (e.g., allow, block, alert) for specified domain names when DNS requests 40A-40N are received from VPC 20A-20N for which firewall protection has been selected by administrators of those VPCs (e.g., one or more firewall rules have been associated with those VPCs). In some embodiments, the DNS resolver instances 110 may automatically perform DNS lookups for all DNS requests for VPCs for which firewall protection has not been selected (e.g., no firewall rules have been associated with those VPCs). In some embodiments, the service 100 may include a DNS server 60 that performs DNS lookups to map human-readable domain names to IP addresses. In some embodiments, the DNS server 60 may be implemented in another component of the cloud provider network 10. In some embodiments, the DNS server 60 may be implemented outside of the cloud provider network 10. In some embodiments, a different DNS server may be used for DNS lookups for VPCs with firewall protection than for VPCs without firewall protection.

A DNS request from a computing resource within or attached to a VPC may be routed to the DNS resolution service. For example, DNS requests 40A may be sent from computing resources 30A of VPC 20A to the service 100, and DNS requests 40N may be sent from computing resources 30N of VPC 20N to the service 100. In some embodiments, the DNS requests 40A-40N may be routed through a fleet of proxy instances. A DNS request may include a human-readable domain name such as example.com, and the DNS request may seek to obtain the IP address corresponding to that domain name so that the requesting entity may access that address via the Internet. If DNS resolution is performed for a DNS request, a response may be send to the requesting entity that indicates the IP address. For example, the service 100 may send DNS responses 50A for (at least some of) DNS requests 40A, and the service 100 may send DNS responses 50N for (at least some of) DNS requests 40N.

Upon receiving a DNS request, the DNS resolution service 100 may first determine whether the VPC is associated with any firewall rules. The DNS resolution service 100 may store a set of associations 120 between VPCs and firewall rules. In some embodiments, the associations 120 may simply indicate whether firewall protection has been configured for particular VPCs. In some embodiments, the associations 120 may indicate more particular associations between specific firewall rules (or sets of rules) and specific VPCs. As discussed above, the associations 120 may be selected and/or configured by administrators of VPCs 20A-20N and deployed to the DNS resolver instances 110. In some embodiments, the associations 120 may be automatically deployed to the DNS resolver instances 110 by a control plane of the DNS resolution service 100. In some embodiments, the firewall rules 170A-170M themselves may not be stored by the DNS resolver instances 110.

If the VPC from which a particular DNS request originates is not associated with any firewall rules, then the service 100 may perform DNS resolution 130 to determine an IP address corresponding to the domain name of the DNS request. In some embodiments, the DNS resolver instances 110 may rely on an external DNS server 60 to perform the lookup, e.g., for VPCs without firewall protection. In some embodiments, one of the DNS resolver instances 110 may include a cache of recent lookups to minimize network usage and latency of lookups. The cache may be used for DNS resolution 130 for VPCs without firewall protection but not necessarily for DNS resolution for VPCs with firewall protection.

If the VPC from which a particular DNS request originates is associated with any firewall rules, then the service 100 may apply those rule(s), e.g., to determine what action to take for the DNS request. If firewall protection has been configured for VPCs, the DNS resolver instances 110 may forward DNS queries 140 to the DNS firewall instances 160. The DNS firewall instances 160 may store the firewall rules 170A-170M. By applying the firewall rules 170A-170M associated with a particular VPC, the firewall instances 160 may determine whether to perform specified actions such as allowing DNS requests for particular domains, blocking DNS requests for particular domains, alerting on DNS requests for particular domains, and so on. Thus the DNS firewall instances 160 may determine whether to allow or block 180 a particular DNS request according to relevant firewall rules 170A-170M.

If a DNS request is blocked according to application of the firewall rules 170A-170M, then the DNS firewall instances 160 (or the service 100) may return a response to the request without performing the requested lookup to identify an IP address corresponding to the specified domain name. In some embodiments, for blocked requests, standardized or customized response codes or error codes may be returned to the requesting entity. These codes may be configured by administrators as part of the firewall rules 170A-170M. As shown in FIG. 1, the DNS firewall instances 160 may send data indicating allowed DNS queries 150 to the DNS resolver instances 110. If a DNS request is allowed according to application of the firewall rules 170A-170M, then the DNS firewall instances 160 (or the service 100) may instruct the DNS resolver instances 110 to perform DNS resolution 130 for the request to identify an IP address corresponding to the specified domain name. As discussed above, the DNS resolver instances 110 may leverage a DNS server 60 to perform lookups.

The DNS resolution service 100 may be offered as a native service of a provider network 10 such that other services and resources of the provider network can easily leverage the managed, rules-based firewall protection offered by the service. In some embodiments, one or more components of the DNS resolution service 100 and/or VPCs 20A-20N may be implemented using resources of a provider network, e.g., a cloud provider network 10. A cloud provider network (sometimes referred to simply as a "cloud") 10 refers to a pool of network-accessible computing resources (such as compute, storage, and networking resources, applications, and services), which may be virtualized or bare-metal. The cloud 10 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 10 can be formed as a number of regions, where a region is a separate geographical area in which the cloud provider clusters data centers. Each region can include two or more availability zones (AZs) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network 10 via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network 10 may deliver content from points of presence outside of, but networked with, these regions by way of edge locations and regional edge cache servers (points of presence, or PoPs). This compartmentalization and geographic distribution of computing hardware enables the cloud provider network 10 to provide low-latency resource access to customers on a global scale with a high degree of fault tolerance and stability.

The DNS resolution service 100 may allow a VPC administrator to easily customize and deploy a set of firewall rules across a plurality of VPCs such as VPC 20A and VPC 20N. The DNS resolution service 100 may allow a VPC administrator to easily customize and deploy a set of firewall rules across VPCs in a plurality of availability zones of the cloud provider network 10. In some embodiments, a set of firewall rules may be deployed across VPCs in a plurality of regions of the cloud provider network 10, e.g., using an orchestration component to replicate firewall rules 170A-170M and associations 120 from one region to another region.

The cloud provider network 10 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider 10, in contrast to resources requested by users of the cloud provider network, which may be provisioned in user accounts. Computing resources 30A-30N associated with (e.g., within or attached to) VPCs 20A-20N may be implemented using the resources of the cloud provider network 10.

Computing service(s) may implement various computing resources at one or more data centers. The computing services can include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. The disclosed placement techniques can select a suitable host for the requested instance type based at least partly on the described network performance metrics.

The computing services can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics.

The traffic and operations of the cloud provider network 10 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Computing services may collaborate according to a service-oriented architecture, e.g., such that the functionality of the service 100 can be accessed by clients such as the computing resources 30A-30N. In some embodiments, one or more aspects of the service 100 may be implemented as a service offered within the provider network. In some embodiments, one or more aspects of the DNS server 60 may be implemented as a service offered within the provider network. The service 100 may be implemented using a plurality of different instances that are distributed throughout one or more networks, and each instance may offer access to the functionality of the service to various clients. Because resources of the provider network 10 may be under the control of multiple clients (or tenants) simultaneously, the provider network may be said to offer multi-tenancy and may be termed a multi-tenant provider network.

Figure 7:
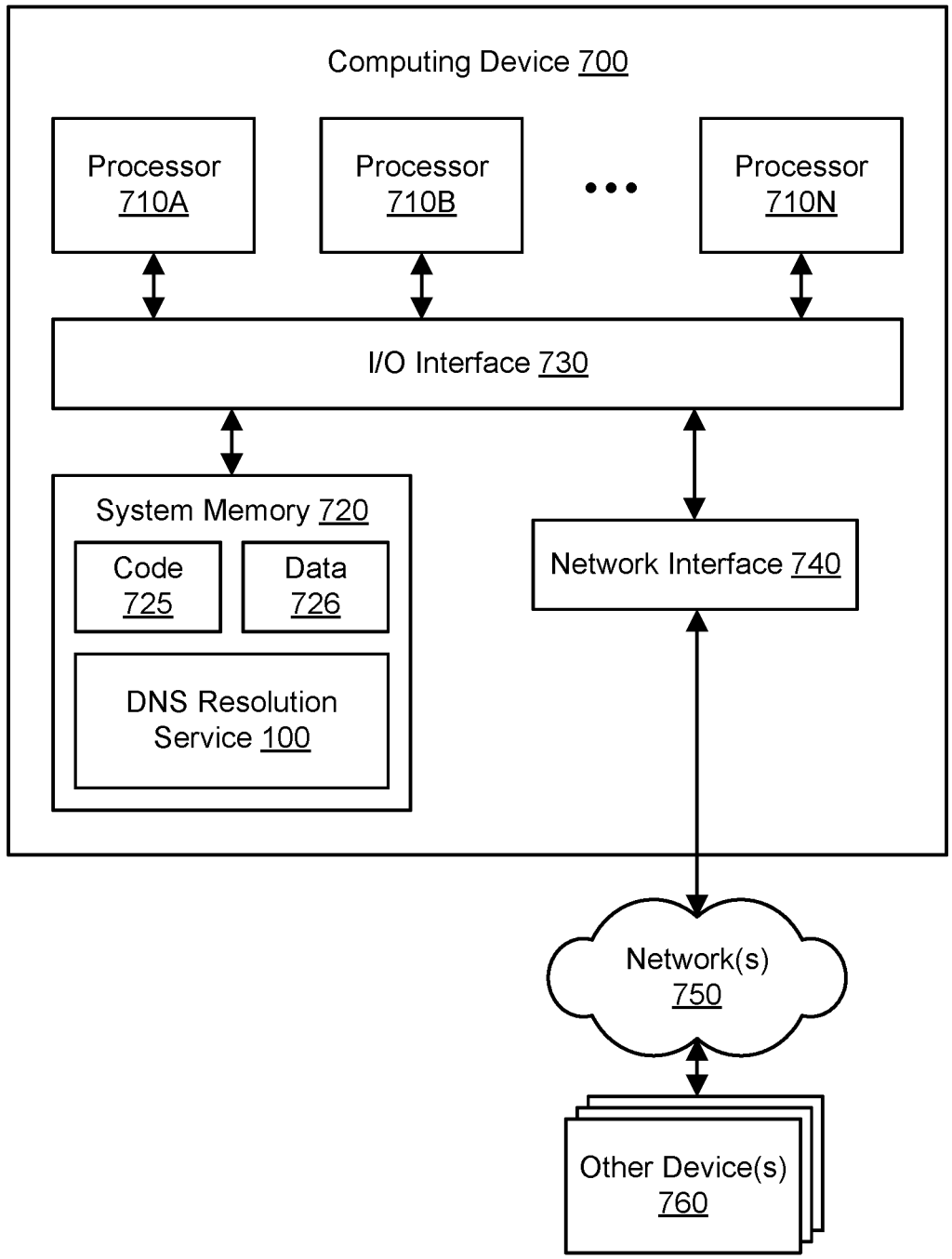
FIG. 7 illustrates an example computing device that may be used in some embodiments.

In various embodiments, components of the service 100 may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the service 100 may be provided by the same computing device or by different computing devices. In various embodiments, if any of the components of the service 100 are implemented using different computing devices, then the components and their respective computing devices may be communicatively coupled, e.g., via one or more networks. Any of the components of the service 100 may represent any combination of software and hardware usable to perform their respective functions. In some embodiments, operations implemented by the service 100 may be performed automatically, e.g., without a need for user initiation or user intervention after an initial configuration stage, and/or programmatically, e.g., by execution of program instructions on at least one computing device. In some embodiments, the service 100 may include additional components not shown, fewer components than shown, or different combinations, configurations, or quantities of the components shown.

Clients of the service 100, such as the computing resources 30A-30N and/or other components of the VPCs 20A-20N, may represent external devices, systems, or entities with respect to the service 100. In one embodiment, the client devices may be implemented using any suitable number and configuration of computing devices, any of which may be implemented by the example computing device 3000 illustrated in FIG. 7. Clients may convey network-based service requests to the service 100 via one or more networks, e.g., to request access to services. The service requests may include invocations of functionality of the service 100 according to one or more application programming interfaces (APIs) or other programmatic interfaces of the service 100. The network(s) may encompass any suitable combination of networking hardware and protocols necessary to establish network-based communications between client devices and the service 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the service 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the service 100. In one embodiment, client devices may communicate with the service 100 using a private network rather than the public Internet. In various embodiments, the various components of the service 100 may also communicate with other components of the system using one or more network interconnects.

Figure 2:
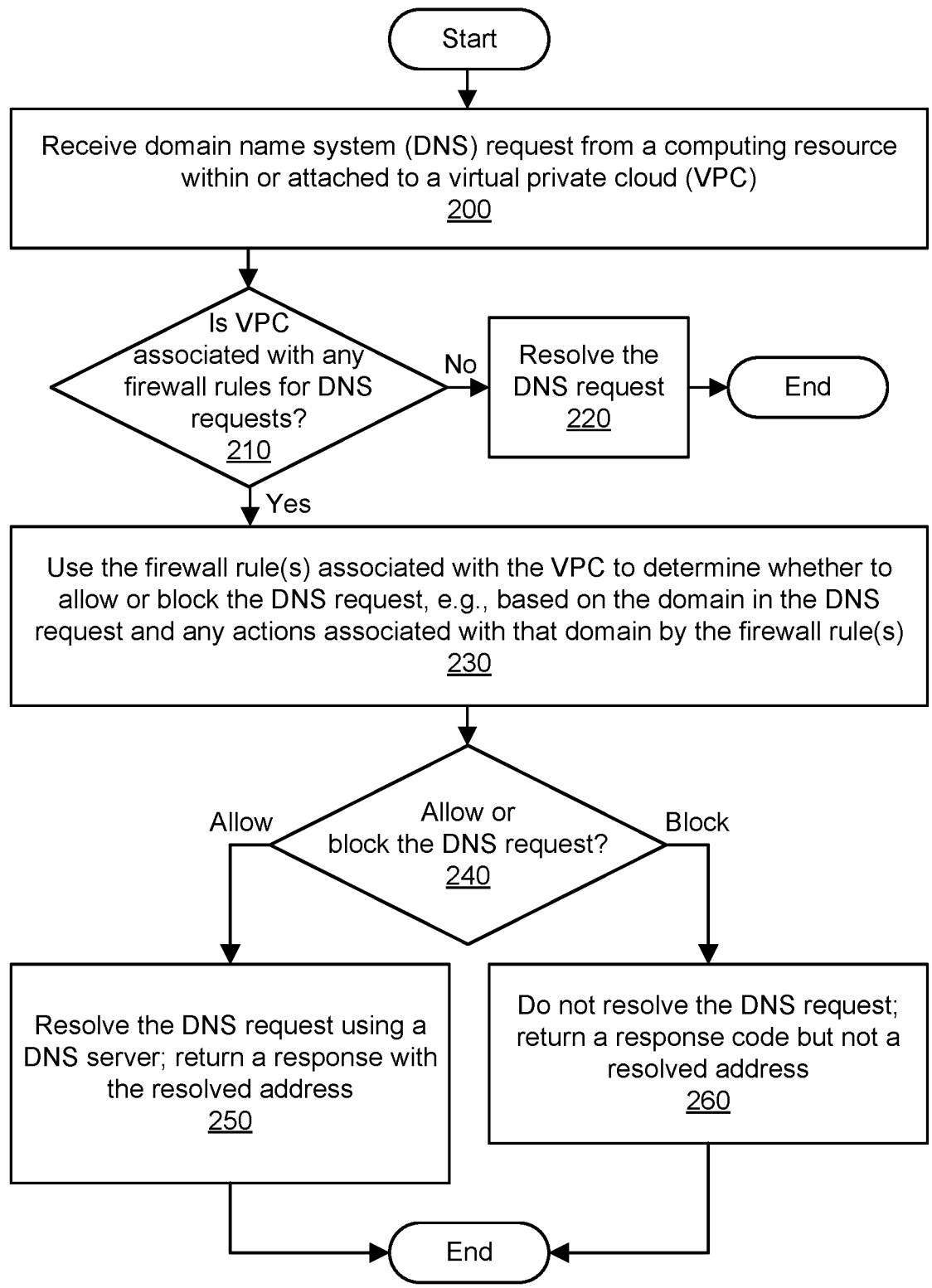
FIG. 2 is a flowchart illustrating a method for customized domain name resolution for virtual private clouds, according to some embodiments.

FIG. 2 is a flowchart illustrating a method for customized domain name resolution for virtual private clouds, according to some embodiments. As shown in 200, a DNS request may be received by a DNS resolution service from one or more resources within or connected to a VPC. As shown in 210, the method may determine whether firewall protection has been configured for the VPC, e.g., whether the VPC is associated with any firewall rules. Using the DNS resolution service, administrators may configure and deploy firewall rules to allow or block requests for DNS resolution for particular domain names from VPCs. A firewall rule may specify one or more domain names, e.g., example.com or www.example.com. Firewall rules may include wildcards, e.g., *.example.com. A firewall rule may also indicate one or more actions to be taken if DNS resolution is sought for a specified set of domain names. For example, DNS requests for one set of domain names may be allowed, DNS requests for another set of domain names may be blocked (with configurable response codes or error codes), and DNS requests for yet another set of domain names may result in alerts to administrators or security teams. Once firewall rules have been specified or selected, administrators may create associations between particular sets of firewall rules and particular VPCs. The associations and firewall rules may be deployed from a control plane to one or more fleets of instances (e.g., DNS resolver instances and DNS firewall instances) of the DNS resolution service. Domain names and actions for firewall rules may thus be customized by administrators of VPCs to meet the security needs of their organizations.

If no firewall rules are applicable to the VPC, then as shown in 220, the DNS request may be resolved. Resolving the DNS request may include determining an IP address that corresponds to the domain name specified in the DNS request. An external DNS server may be used to resolve the DNS request. In some embodiments, a cache of DNS lookups may be used to resolve the DNS request.

If one or more firewall rules are applicable to the VPC, then as shown in 230, the method may apply the rule(s) to determine what action to take (e.g., allowing or blocking the DNS request) according to the rule(s). In some embodiments, a DNS resolver instance may perform the operation shown in 210, and a DNS firewall instance may perform the operation shown in 230. As shown in 240, the method may determine whether the DNS request is allowed or blocked according to the firewall rule(s).

If the DNS request is allowed, then as shown in 250, the method may perform DNS resolution for the request to identify an IP address corresponding to the specified domain name. As discussed above, the DNS resolver instances may leverage a DNS server to perform lookups. After resolution of the DNS request, the method may return a response with the resolved address to the computing resource in the VPC that sent the original request.

If the DNS request is blocked, then as shown in 260, the method may return a response code without performing the requested lookup to identify an IP address corresponding to the specified domain name. In some embodiments, for blocked requests, standardized or customized response codes or error codes may be returned to the requesting entity. These codes may be configured by administrators as part of the firewall rules. Using these techniques, DNS requests may be filtered according to custom rules using a managed service in a cloud provider environment.

Figure 3:
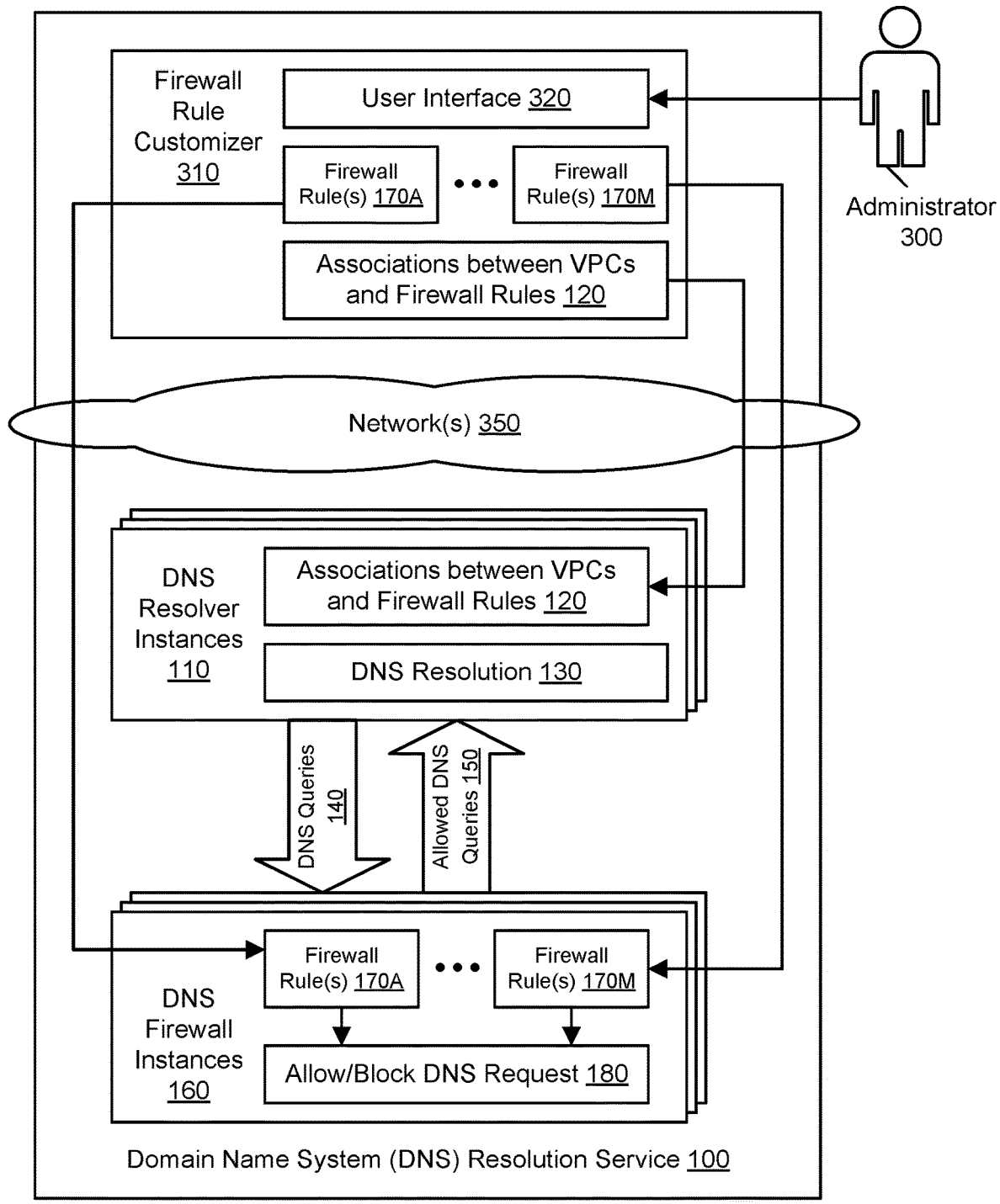
FIG. 3 illustrates further aspects of the example system environment for customized domain name resolution for virtual private clouds, including the customization of firewall rules and associations between VPCs and firewall rules, according to some embodiments.

FIG. 3 illustrates further aspects of the example system environment for customized domain name resolution for virtual private clouds, including the customization of firewall rules and associations between VPCs and firewall rules, according to some embodiments. In some embodiments, an administrator 300 of one or more VPCs 20A-20N may use a firewall rule customizer 310 to select and configure firewall protection. Firewall rules may be selected or customized, associated with one or more VPCs, and deployed to components of the DNS resolution service by a VPC administrator 300 using the customizer 310. In some embodiments, administrators may use a user interface 320 of the customizer 310, such as a graphical user interface (GUI), command-line interface (CLI), and/or voice-enabled interface, to customize firewall rules and associate firewall rules with VPCs. In various embodiments, the user interface may be part of the customizer 310 itself or may instead be implemented using a management console of the cloud provider network 10. In some embodiments, an administrator 300 may use an application programming interface (API) or other programmatic interface offered by the customizer 310 to customize firewall rules and associate firewall rules with VPCs. The firewall rule customizer 310 may be part of a control plane of the service 100 or cloud provider network 10.

The firewall rule customizer 310 may automatically deploy associations 120 and firewall rules 170A-170M to relevant components of the DNS resolution service 100. Associations 120 may be sent from the customizer 310 to the DNS resolver instances 110 via one or more networks 350. Similarly, firewall rules 170A-170M may be sent from the customizer 310 to the DNS firewall instances 160 via one or more networks 350. Using these techniques, the managed service 100 may facilitate quick and easy customization and network-based deployment of firewall rules for DNS request filtering across one or more VPCs. Customization may be performed by an administrator 300 via a user interface 320 and without requiring the administrator to install and manage a hardware appliance to perform DNS request filtering.

Figure 4A:
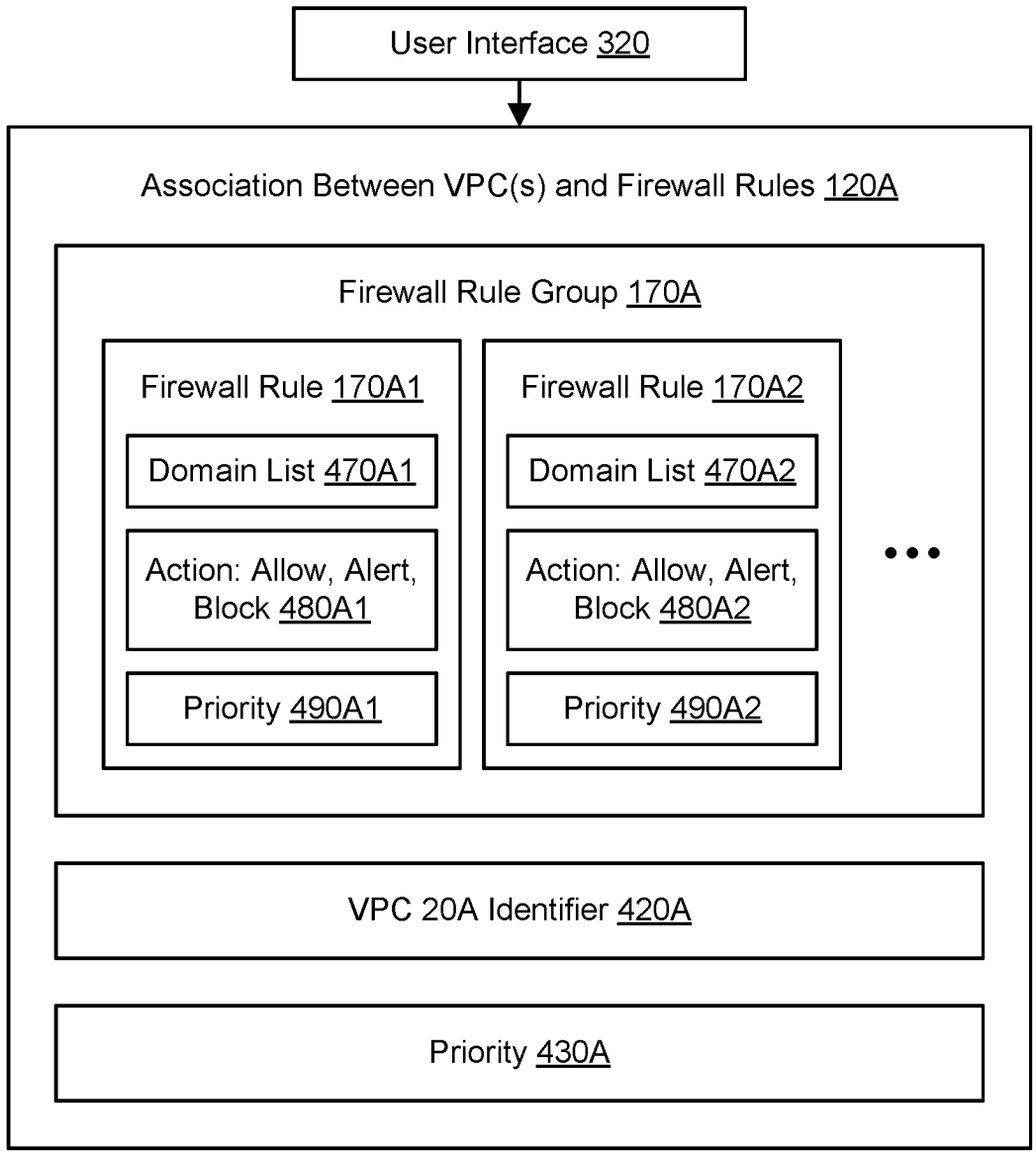
FIG. 4A and FIG. 4B illustrates further aspects of the example system environment for customized domain name resolution for virtual private clouds, including components of customized firewall rule groups and related configurations, according to some embodiments.
Figure 4B:
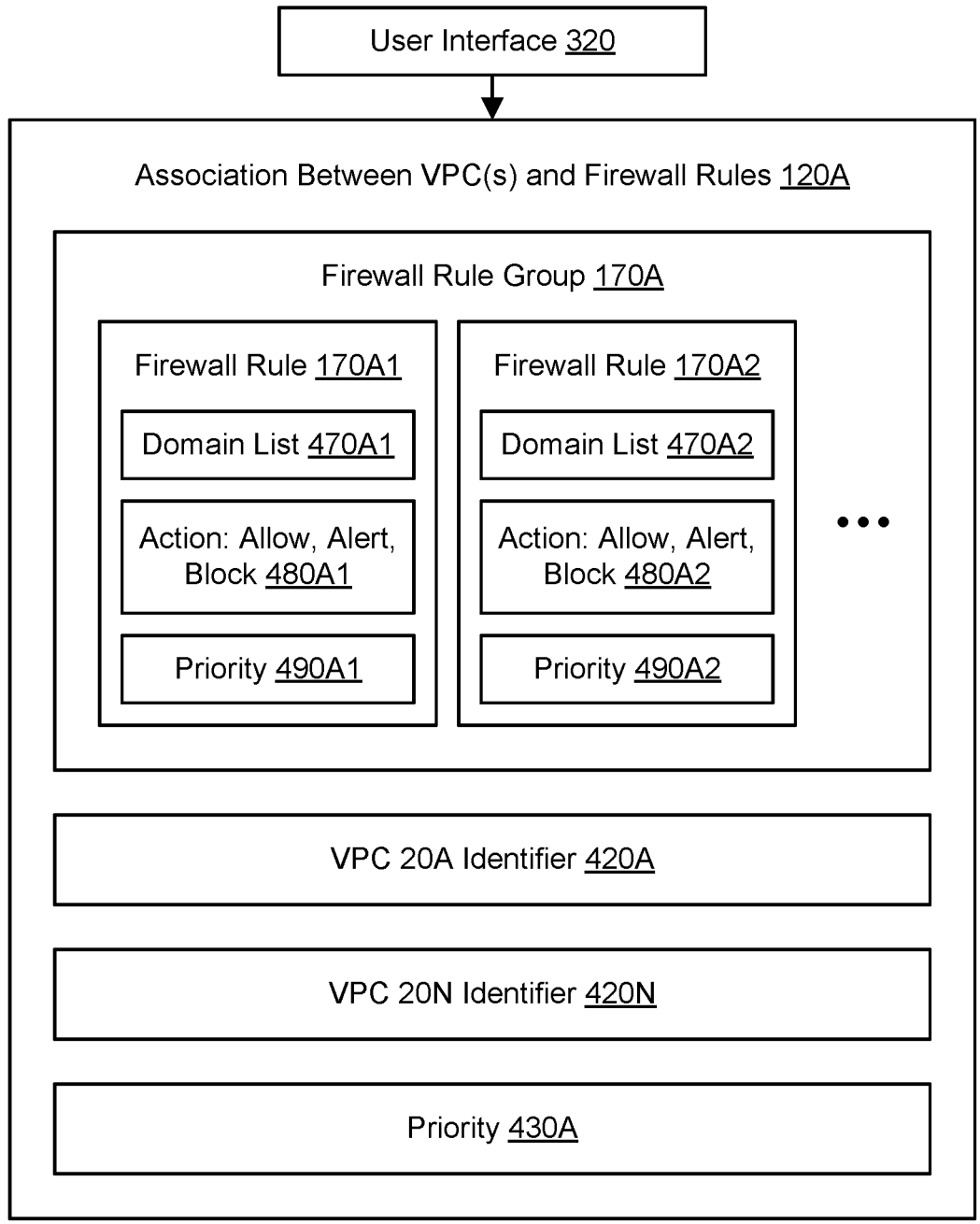

FIG. 4A and FIG. 4B illustrates further aspects of the example system environment for customized domain name resolution for virtual private clouds, including components of customized firewall rule groups and related configurations, according to some embodiments. As discussed above, via a user interface 320, an administrator 300 of one or more VPCs may create an association 120A between one or more VPCs and one or more firewall rules. The association 120A may include a firewall rule group 170A. The firewall rule group 170A may include one or more firewall rules such as firewall rule 170A1, firewall rule 170A2, and so on.

The firewall rule 170A1 may specify one or more domains in a domain list 470A1. The domain list 470A1 may include fully qualified domain names and/or wildcards in domain names. The firewall rule 170A1 may specify one or more actions 480A1 to be taken for DNS requests for any domains in the domain list 470A1. For example, the DNS lookups for any of the domains in the domain list 470A1 may be allowed, alerted, or blocked. In some embodiments, a block action may be configured with a response such as NxDomain, NoData, Override, and so on. The firewall rule 170A1 may also include a priority 490A1 that can be used to resolve conflicts with other firewall rules.

Similarly, the firewall rule 170A2 may specify one or more domains in a domain list 470A2. The domain list 470A2 may include fully qualified domain names and/or wildcards in domain names. The firewall rule 170A2 may specify one or more actions 480A2 to be taken for DNS requests for any domains in the domain list 470A2. For example, the DNS lookups for any of the domains in the domain list 470A2 may be allowed, alerted, or blocked. In some embodiments, a block action may be configured with a response such as NxDomain, NoData, Override, and so on. The firewall rule 170A2 may also include a priority 490A2 that can be used to resolve conflicts with other firewall rules.

As shown in FIG. 4A, the firewall rule group 170A may be associated with a single VPC 20A, as represented in the association 120A by an identifier 420A. As shown in FIG. 4B, the same firewall rule group 170A may be associated with a plurality of VPCs such as VPC 20A and VPC 20N, as represented in the association 120A by identifier 420A and identifier 420N. The firewall rule group 170A itself may also include a priority 430A that can be used to resolve conflicts with other firewall rule groups.

Figure 5:
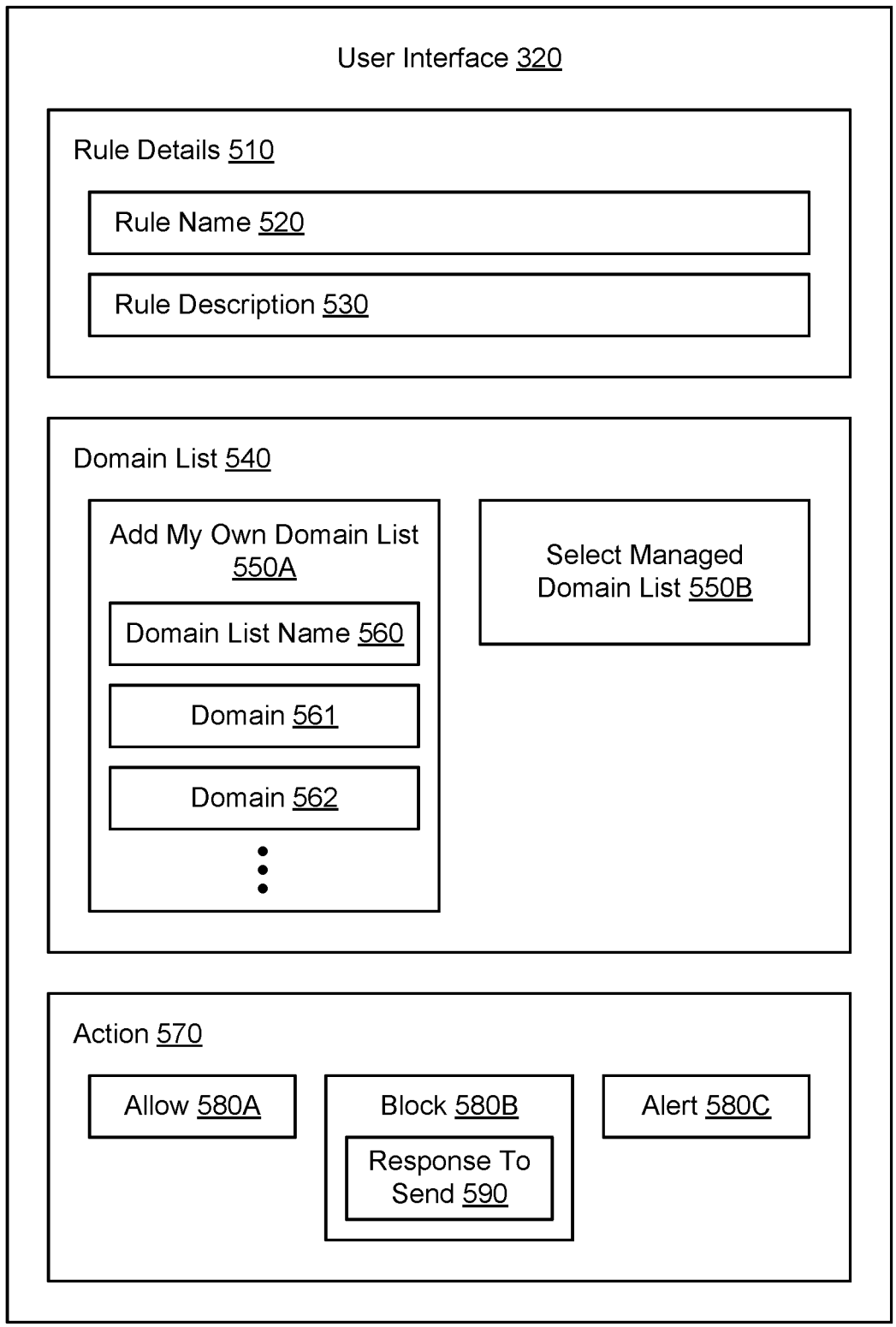
FIG. 5 illustrates further aspects of the example system environment for customized domain name resolution for virtual private clouds, including an example of user interface elements usable to customize firewall rules, according to some embodiments.

FIG. 5 illustrates further aspects of the example system environment for customized domain name resolution for virtual private clouds, including an example of user interface elements usable to customize firewall rules, according to some embodiments. As discussed above, a GUI offered by the DNS resolution service 100 or cloud provider network 10 may be used by administrators to customize firewall rules and select those rules for particular VPCs. The user interface 320 may provide one or more user interface elements permitting an administrator to specify rule details 510 for a firewall rule. The rule details 510 may include, for example, a rule name 520 and a rule description 530. The user interface 320 may provide one or more user interface elements permitting an administrator to specify a domain list 540 for a firewall rule. In some embodiments, the user interface 320 may allow the administrator to "select a managed domain list" 550B that includes a predefined list of domain names to be filtered. The user interface 320 may also allow the administrator to "add my own domain list" 550A for additional customization. The manually specified domain list may include a domain list name 560 and a set of domain names such as domain 561, domain 562, and so on. The user interface 320 may provide one or more user interface elements permitting an administrator to specify an action 570 to be performed for the domain list. For example, the administrator may select an allow action 580A, a block action 580B, or an alert action 580C. In some embodiments, upon selecting the block action 580B, the administrator may select a response 590 to be sent in case the block action is performed. For example, the block 580B may result in a "NoData" response indicating that the query was successful but no response is available, an "NxDomain" response indicating that the domain name does not exist, an "Override" response to provide a custom override response to the query, and so on. In various embodiments, the alert action 580C may be performed in combination with allowing or blocking a DNS request. The user interface 320 may provide one or more user interface elements permitting an administrator to associate the customized firewall rule (or rule group) with a particular VPC for which the administrator has appropriate privileges.

Figure 6:
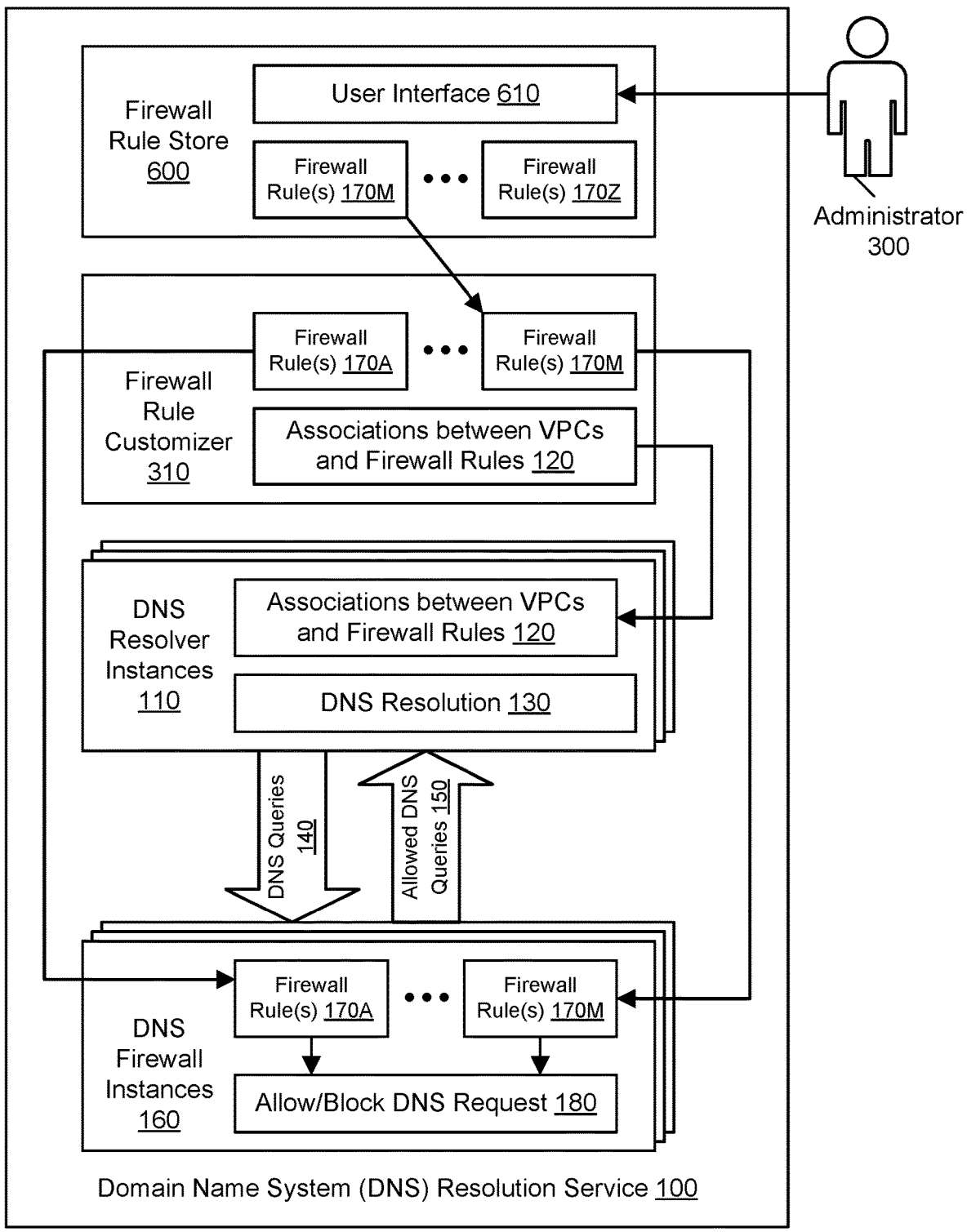
FIG. 6 illustrates further aspects of the example system environment for customized domain name resolution for virtual private clouds, including a firewall rule store from which firewall rules can be selected, according to some embodiments.

FIG. 6 illustrates further aspects of the example system environment for customized domain name resolution for virtual private clouds, including a firewall rule store from which firewall rules can be selected, according to some embodiments. In some embodiments, predefined firewall rules 170M may be selected by an administrator 300 from a firewall rule store 600. The store 600 may list predefined firewall rules 170M-170Z and permit customers of the store to browse and select individual rules and/or firewall rule groups. The rules and/or rule groups in the store 600 may indicate domains and actions but may not be associated with particular VPCs. Upon selection of a set of firewall rule(s) 170M by the administrator 300, the selected rule(s) may then be associated with one or more VPCs such as VPC 20A and/or VPC 20N. In some embodiments, firewall rules 170M-170Z may be offered in exchange for fees. The firewall rule store 600 may facilitate even easier and faster customization of DNS request filtering for VPCs.

Illustrative Computer System

In at least some embodiments, a computer system that implements a portion or all of one or more of the technologies described herein may include a computer system that includes or is configured to access one or more computer-readable media. FIG. 7 illustrates such a computing device 700 according to one embodiment. In the illustrated embodiment, computing device 700 includes one or more processors 710A-710N coupled to a system memory 720 via an input/output (I/O) interface 730. In one embodiment, computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). In one embodiment, processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In one embodiment, in multiprocessor systems, each of processors 710A-710N may commonly, but not necessarily, implement the same ISA.

In one embodiment, system memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720, e.g., as code (i.e., program instructions) 725 and data 726. In the illustrated embodiment, program code implementing aspects of the DNS resolution service 100 may be stored in system memory 720.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In some embodiments, some or all of the functionality of I/O interface 730, such as an interface to system memory 720, may be incorporated directly into processors 710A-710N.

In one embodiment, network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, in some embodiments, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 700 via I/O interface 730. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 700 as system memory 720 or another type of memory. In one embodiment, a computer-readable medium may include transmission media or signals such as electrical, electromagnetic, or digital signals, conveyed via a communication medium such as a network and/or a wireless link, such as may be implemented via network interface 740. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
 a domain name system (DNS) resolution service comprising one or more processors and one or more memories to store computer-executable instructions that, when executed, cause the one or more processors to:
  receive a DNS request from a virtual private cloud (VPC) comprising one or more computing resources, wherein the one or more computing resources are implemented using one or more resource pools of a cloud provider network, and wherein the DNS resolution service is implemented as a service of the cloud provider network;
  determine that the VPC is associated with one or more firewall rules, wherein the one or more firewall rules comprise one or more domain names and one or more actions associated with the one or more domain names;
  responsive to determining that the VPC is associated with the one or more firewall rules, use a firewall instance to determine whether the DNS request is allowed or blocked according to the one or more firewall rules;
if the DNS request is allowed, resolve the DNS request using a DNS server; and
if the DNS request is blocked, return a response to the VPC without resolving the DNS request.

2. The system as recited in claim 1, further comprising:
a rule customizer comprising an additional one or more processors and an additional one or more memories to store additional computer-executable instructions that, when executed, cause the additional one or more processors to:
determine the one or more domain names and the one or more actions of the one or more firewall rules based at least in part on input to a user interface;
determine an association between the VPC and the one or more firewall rules based at least in part on additional input to the user interface;
deploy, to the DNS resolution service via one or more networks, the association between the VPC and the one or more firewall rules; and
deploy, to the firewall instance via one or more networks, the one or more firewall rules.

3. The system as recited in claim 1, wherein the one or more memories store additional computer-executable instructions that, when executed, cause the one or more processors to:
store an association between the one or more firewall rules and a plurality of VPCs including the VPC; and
use the one or more firewall rules to determine whether to allow or block a plurality of additional DNS requests for the plurality of VPCs.

4. The system as recited in claim 3, wherein the plurality of VPCs are implemented in a plurality of availability zones of the cloud provider network.

5. A method, comprising:
receiving, by a domain name system (DNS) resolution service, a DNS request from a computing resource associated with a virtual private cloud (VPC) in a cloud provider network;
determining, by the DNS resolution service, that the VPC is associated with one or more firewall rules;
responsive to determining that the VPC is associated with the one or more firewall rules, determining, by the DNS resolution service, the DNS request is allowed or blocked according to the one or more firewall rules; and
resolving, by the DNS resolution service, the DNS request using a DNS server and returning a response to the DNS request to the computing resource if the DNS request is allowed; and
wherein the DNS request is not resolved by the DNS resolution service if the DNS request is blocked.

6. The method as recited in claim 5, wherein an individual one of the one or more firewall rules comprises one or more domain names and one or more allow actions associated with individual ones of the one or more domain names.

7. The method as recited in claim 5, wherein an individual one of the one or more firewall rules comprises one or more domain names and one or more block actions associated with individual ones of the one or more domain names.

8. The method as recited in claim 5, wherein firewall protection is selected and the one or more firewall rules are determined based at least in part on input from an administrator of the VPC.

9. The method as recited in claim 5, wherein determining whether the DNS request is allowed or blocked according to the one or more firewall rules is performed using a firewall instance, wherein the DNS resolution service stores an association between the VPC and the one or more firewall rules, and wherein the firewall instance stores the one or more firewall rules.

10. The method as recited in claim 9, further comprising:
determining, using a rule customizer, one or more domain names and one or more actions of the one or more firewall rules based at least in part on input to a user interface;
determining, using the rule customizer, the association between the VPC and the one or more firewall rules based at least in part on additional input to the user interface;
deploying, from the rule customizer to the DNS resolution service via one or more networks, the association between the VPC and the one or more firewall rules; and
deploying, from the rule customizer to the firewall instance via one or more networks, the one or more firewall rules.

11. The method as recited in claim 5, further comprising:
storing an association between the one or more firewall rules and a plurality of VPCs including the VPC; and
using the one or more firewall rules to determine whether to allow or block a plurality of additional DNS requests for the plurality of VPCs.

12. The method as recited in claim 11, wherein the plurality of VPCs are implemented in a plurality of availability zones of the provider network.

13. The method as recited in claim 5, wherein the DNS resolution service is implemented as a service of the cloud provider network.

14. One or more non-transitory computer-readable storage media storing program instructions that, when executed on or across one or more processors, perform:
receiving, by a domain name system (DNS) resolver, a DNS request from a virtual private cloud (VPC) comprising one or more computing resources and implemented using one or more resource pools of a multi-tenant provider network, wherein the DNS resolver is implemented using a service of the multi-tenant provider network;
determining, by the DNS resolver, that the VPC is associated with one or more firewall rules, wherein the one or more firewall rules comprise one or more domain names and one or more actions associated with the one or more domain names;
determining, by the DNS resolver based at least in part on determining that the VPC is associated with the one or more firewall rules, whether the DNS request is allowed or blocked according to the one or more firewall rules;
if the DNS request is allowed, resolving, by the DNS resolver, the DNS request using a DNS server; and
if the DNS request is blocked, returning, by the DNS resolver, a response to the DNS request without resolving the DNS request.

15. The one or more non-transitory computer-readable storage media as recited in claim 13, wherein an individual one of the one or more firewall rules comprises one or more domain names and one or more allow actions or block actions associated with individual ones of the one or more domain names.

16. The one or more non-transitory computer-readable storage media as recited in claim 13, wherein firewall protection is selected and the one or more firewall rules are determined based at least in part on input from an administrator of the VPC.

17. The one or more non-transitory computer-readable storage media as recited in claim 13, wherein determining whether the DNS request is allowed or blocked according to the one or more firewall rules is performed using a firewall instance, wherein the DNS resolver stores an association between the VPC and the one or more firewall rules, and wherein the firewall instance stores the one or more firewall rules.

18. The one or more non-transitory computer-readable storage media as recited in claim 17, further comprising additional program instructions that, when executed on or across the one or more processors, perform:
   determining, using a rule customizer, one or more domain names and one or more actions of the one or more firewall rules based at least in part on input to a user interface;
   determining, using the rule customizer, the association between the VPC and the one or more firewall rules based at least in part on additional input to the user interface;
   deploying, from the rule customizer to the DNS resolver via one or more networks, the association between the VPC and the one or more firewall rules; and
   deploying, from the rule customizer to the firewall instance via one or more networks, the one or more firewall rules.

19. The one or more non-transitory computer-readable storage media as recited in claim 14, further comprising additional program instructions that, when executed on or across the one or more processors, perform:
   storing an association between the one or more firewall rules and a plurality of VPCs including the VPC; and
   using the one or more firewall rules to determine whether to allow or block a plurality of additional DNS requests for the plurality of VPCs.

20. The one or more non-transitory computer-readable storage media as recited in claim 14, wherein the one or more firewall rules are selected from a store offering a plurality of firewall rules published by a plurality of firewall rule publishers.

* * * * *